United States Patent [19]

Schmidt et al.

[11] 4,050,370

[45] Sept. 27, 1977

[54] SPIRAL MEAT SLICER WITH IMPROVED RECIPROCATING KNIFE STRUCTURE

[75] Inventors: Louis Charles Schmidt, Bloomfield Hills, Mich.; Richard P. Farbolin, Lilburn, Ga.

[73] Assignee: Schmidt, Trustee under Harry J. Hoenselaar Trust Agreement of Oct. 4, 1973, Mary Jane, Troy, Mich.

[21] Appl. No.: 665,800

[22] Filed: Mar. 11, 1976

[51] Int. Cl.$^2$ .................. A23N 23/00; A23N 7/00; A47J 17/16
[52] U.S. Cl. .................................. 99/538; 99/594
[58] Field of Search .......... 99/538, 541, 594, 597–598; 30/346, 356; 17/1 G, 46; 83/411, 425, 733

[56] References Cited

U.S. PATENT DOCUMENTS 3,153,436 10/1964 Chesley .................. 99/538

FOREIGN PATENT DOCUMENTS 21,489 10/1920 France

Primary Examiner—Harvey C. Hornsby
Assistant Examiner—Robert Pous
Attorney, Agent, or Firm—Whittemore, Hulbert & Belknap

[57] ABSTRACT

A spiral meat slicer is provided which will form a continuous spiral slice on a piece of meat such as a ham which has a center bone structure which includes a crooked bone of non-uniform diameter. The spiral meat slicer includes an improved reciprocating knife structure.

2 Claims, 4 Drawing Figures

SPIRAL MEAT SLICER WITH IMPROVED RECIPROCATING KNIFE STRUCTURE

BACKGROUND OF THE INVENTION

In U.S. Pat. No. 3,153,436, a spiral meat slicer is disclosed. The present invention constitutes an improvement over such a spiral meat slicer.

The spiral meat slicer disclosed in the aforementioned patent has proved to be generally satisfactory in service. However, one problem encountered with such spiral meat slicers is that various parts, particularly bearings and bushings associated with the knife carriage used, have worn out quite rapidly. It is believed that this has been because of excessive vibration of the meat slicer caused by the reciprocating knife structure used to slice meat. A triangularly shaped blade has been used in the past in connection with such spiral meat slicers. The present invention provides a blade structure in modified form which appreciably reduces the vibration level of the meat slicer.

SUMMARY OF THE INVENTION

The spiral meat slicer is forming a continuous spiral slice on a cut of meat having an irregularly shaped bone extending therein. The slicer comprises means for mounting the meat with the bone as a substantially vertical axis about which to rotate the meat. A vertically movable carriage is provided. A knife for slicing the meat is mounted on the carriage. The knife is positioned with respect to the axis of rotation of the bone to enable a spiral cut to be made in the meat. The knife is an elongated member having a relatively wide base for mounting on the knife carriage. The knife includes a rearward edge and a forward edge. The foward edge includes a cutting edge for slicing the meat. The cutting edge comprises a first portion extending from the base and curving toward the rearward edge of the knife and a second straight portion extending therefrom to the outer end of the knife blade. Means are provided for longitudinally reciprocating the knife against the meat. Means are provided for automatically tensioning the knife against the meat. Further means are provided for rotating the meat, and means are provided for relatively moving the carriage vertically with respect to the meat to advance the knife along the axis of rotation of the meat to form a continuous spiral slice in the meat. The curved portion of the cutting edge of the knife extends to about the midpoint of the cutting edge. The straight portion defines the remainder of the cutting edge. The knife is preferably about one-eighth inch thick and a bevel is provided on the underside of the knife at the forward edge to define the cutting edge of the knife.

IN THE DRAWINGS

The spiral meat slicer 10 includes five basic elements including means for mounting the meat, means for rotating the meat, reciprocating knife structure, means for tensioning the knife blade against the meat, and means for moving the knife structure upwardly. Exact details of these structures are disclosed in prior U.S. Pat. No. 3,153,346 in connection with which the present invention comprises an improved structure.

Figure 1:
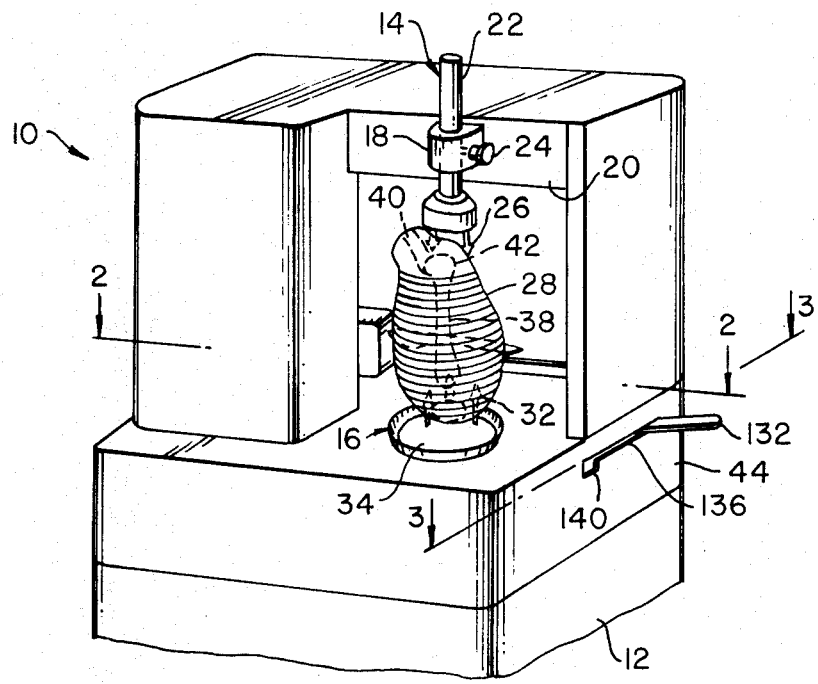
FIG. 1 is a view in perspective of one embodiment of the spiral meat slicer of the present invention.

As may be seen in FIG. 1, the spiral meat slicer 10 is mounted on a support structure 12 which supports the slicing apparatus at a convenient working level. The means for mounting the meat include an upper axially adjustable support 14 and lower rotatably driven support 16. The upper support 14 comprises a bracket 18 having an opening therethrough. The bracket 18 is mounted on a structural member 20. Slidably received in the bracket 18 is an axially adjustable rod 22. The rod 22 is secured in adjusted positions by means of a set screw 24 threadingly received in the bracket 18. A rotatable prong structure 26 is provided on the lower end of the rod 22 to engage a ham 28.

The lower rotatably driven support 16 includes a power driven shaft 30 (FIG. 3) which extends upwardly. Carried on the upper end of the shaft 30 is a prong structure 32 which engages the lower end of the ham 28. A disc-shaped cover plate 34 is received on the prong structure. The plate 34 provides a sturdy, meat-supporting device.

Referring to FIG. 1, it may be seen that the ham 28 may be mounted between the upper and lower support members 14, 16. In mounting a ham, the butt end of the ham is inserted on the prong structure 32 to a position where the lower end of the ham rests on the plate 34. The leg bone 38, having joints 40, 42 is positioned upright so that the bone 38 forms a substantially vertical axis of rotation for the ham. After the ham has been positioned on the lower support, the upper support is lowered to insert the prong structure 26 into the shank end of the ham. One of the prongs may be inserted directly into the joint 40. The set screw 24 is then tightened and the ham is in position for slicing.

Figure 3:
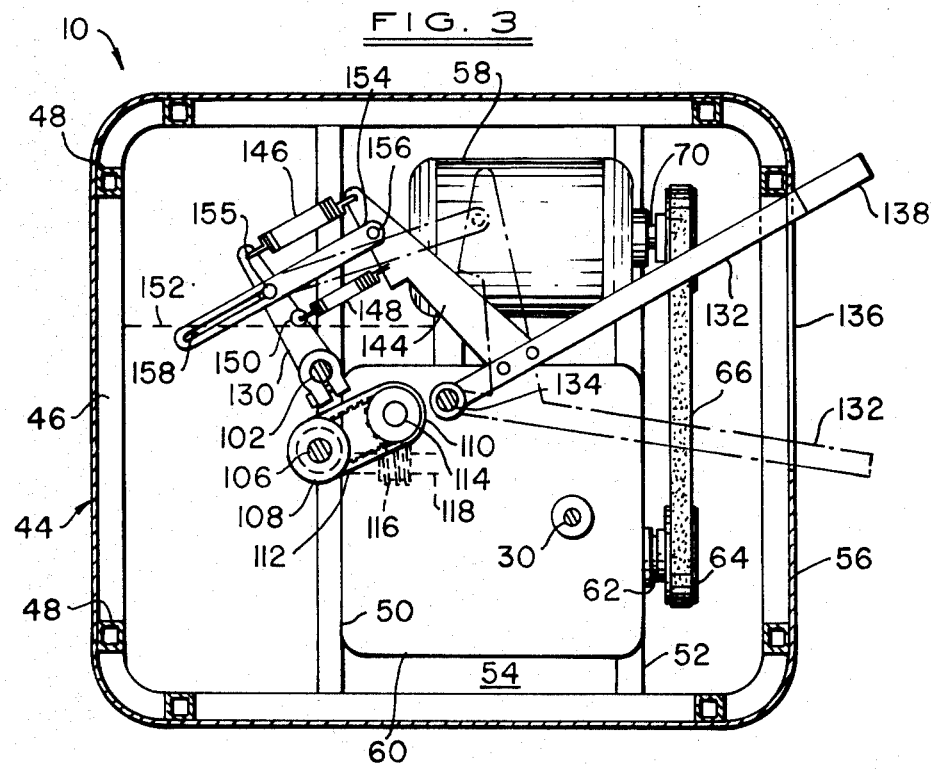
FIG. 3 is a sectional plan view of the meat slicer taken substantially along the line 3—3 of FIG. 1 looking in the direction of the arrows.

As previously mentioned, the lower support shaft 30 is power driven. The drive means for the shaft 30 are shown in FIG. 3. The drive mechanism is mounted in a housing 44 which is supported directly on the slicer support structure 12. The housing 44 comprises a generally rectangular tubular lower support 46 having a plurality of upwardly extending spaced-apart support members 48. Additional support structures are provided on the upper ends of members 48. The lower support 46 has a pair of spaced-apart transverse support tubes 50, 52 which carry therebetween a support platform 54. A sheet metal cover 56 is provided on the exterior of the housing 44.

Mounted on the platform 54 is an electric motor 58 and a gearbox 60. A shaft 62 extends exteriorly of the gearbox 60 and has mounted on its exterior end a pulley wheel 64. The pulley 64 is connected by a belt 66 to a pulley 68 which is on the output shaft 70 of the motor 58. Actuation of the motor 58 is consequently effective to rotate the gearbox shaft 62. The shaft 30 is connected to one output of the gearbox 60 and is rotatably driven thereby resulting in rotation of the ham 28 mounted between the support structures 12, 14.

Figure 2:
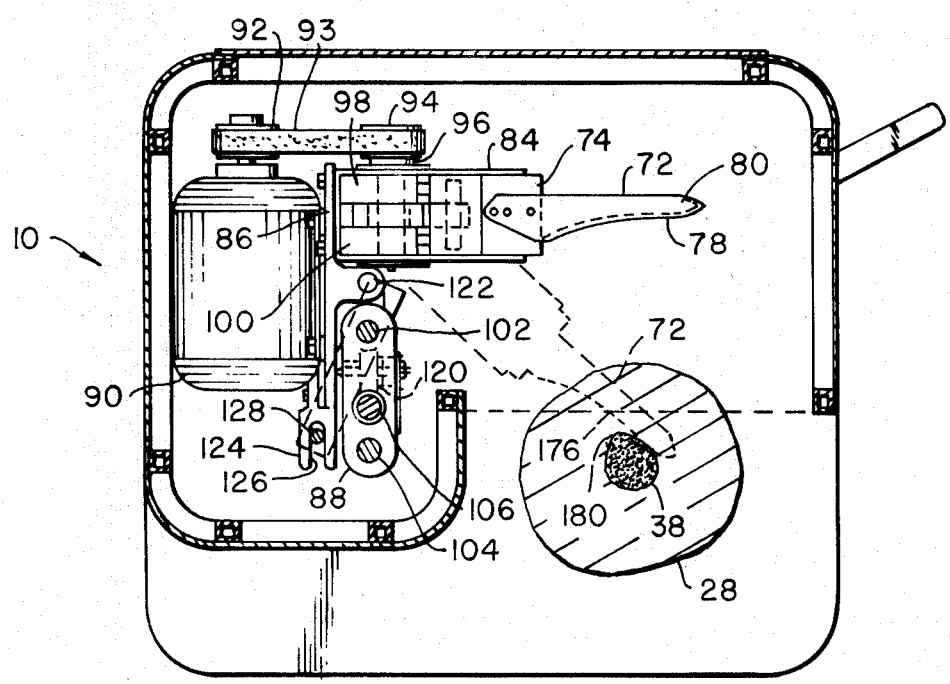
FIG. 2 is a top plan sectional view of the meat slicer taken substantially along the line 2-2 of FIG. 1 looking in the direction of the arrows.

The reciprocating knife structure is best seen in FIG. 2. This structure comprises a knife blade 72 which is secured at one end by means of screws to a movable support block 74. The free end of the blade 72 extends to a point beyond the vertical axis of the meat supporting members 14, 16. The blade is preferably oriented to permit it to follow the angle of the helix which it cuts on a piece of meat. This may be accomplished by tilting the blade with respect to the horizontal or by providing a bevel 76 (FIG. 4) on the underside 82 of the blade 72 extending from the cutting edge 78. In this configuration, the blade must be relatively thick as, for example, one-eighth of an inch. The upper surface 80 of the blade 72 and the surface defined by the bevel 76 form a V-shaped configuration terminating in the cutting edge 78. This V, assuming the upper and lower surfaces 80, 82 of the blade to be oriented substantially in the horizontal plane, results in aiming the apex, or cutting edge 78 of the blade, upwardly in the desired manner to follow the angle of the helix which is cut on the ham 28.

Theoretically, the angle of the blade should be adjusted for each different helix it is desired to cut. However, it has been found in practice that if the blade is oriented to correspond to the generally desired helix, it will perform satisfactorily.

The block 74 is mounted for reciprocal movement in a bracket 84. The bracket is secured on a vertically oriented plate 86. The plate 86 is pivotally mounted on a vertically movable carriage 88. An electric motor 90 is mounted on the reverse side of the plate 86. The output shaft of the motor carries a pulley 92 which is drivingly connected by belt 93 to a pulley 94 mounted on shaft 96. The shaft 96 is rotatably mounted in bearing blocks 98, 100. The shaft 96 is operatively connected to a crank and cam structure (not shown) to cause reciprocation of the block 74. As will be appreciated, reciprocal motion of the block 74 will cause the knife blade 72 to reciprocate in a cutting action.

The means for moving the knife blade structure upwardly may best be seen in FIGS. 2 and 3. As previously mentioned, the plate 86 which carries the knife blade structure is mounted on a vertically movable carriage 88. The carriage 88 may be conveniently fabricated as a casting. The carriage 88 is mounted for sliding movement on spaced apart vertical guides 102, 104. A vertical worm 106 extends through the carriage 88. The worm 106 is rotatably driven by the motor 58 through the gearbox 60. As may best be seen in FIG. 3, the lower end of the worm carries a pulley 108. The pulley 108 is connected to a pulley 110 by means of a belt 112. Pulley 110 is mounted on a shaft 114 which extends into the gearbox 60. A worm gear is carried on the inner end of shaft 114 and meshes with a worm 116 carried on a shaft 118 which is driven by the gearbox structure.

The worm 106, when rotated by the gearbox 60, is effective to raise the carriage 88. A worm gear 120 is provided on the carriage to engage the worm 106. The worm gear has an associated clutch mechanism whereby to engage the worm only during periods when it is desired to raise the carriage. After the cut of meat has been completely slice, the clutch is released and the weight of the carriage 88 will cause the carriage to slide down guides 102, 104 to the initial starting position. Downward movement of the carriage is restrained by means of a counterbalance system.

The means for tensioning the knife blade against the meat and the improved knife structure, which may be best seen in FIGS. 2, 3 and 14, will now be explained. As previously mentioned, the knife structure is mounted on pivotal plate 86. The plate 86 is pivotally mounted at 122 for pivoting about a vertical axis.

As shown in FIG. 2, the plate 86 has a forked arm 124 secured thereto. The arm 124 has the slot 126 at its upper end which slidingly receives a vertical rod 128. The rod 128 is connected at its upper and lower ends to a horizontally pivotal support structure which in turn is connected to pivotal guide shaft 102. Referring to FIG. 3, a pivotal arm 130 is fixedly connected to the guide shaft 102.

A manually operable handle structure is provided to cause pivoting of the arm 130. The manual means include an arm 132 which is rotatably mounted on a vertical rod 134. The arm 132 is capable of slight up and down pivoting. The arm 132 extends horizontally through an elongated opening 136 provided in the cover 56. The arm 132 terminates exteriorly of the slicer construction in a handle portion 138. The opening 136 includes a downwardly extending detent 140 at one end. The arm 132 normally bears downwardly against the lower edge of the opening 136. When the arm is pivoted to a position over detent 140, it will fall into the detent, thus locking the arm in this pivoted position.

The arm 132 is provided, adjacent its inner end, with an extension 144 which projects outwardly therefrom at substantially right angles. The extension 144 is connected to the arm 130 by means of a spring 146 which extends between the outer ends of these members. A second spring 148 extends from the extension 144 into engagement with a bracket 150 which is secured to a fixed structural member indicated by the dotted line 152. An elongated member 154 is pivotally mounted by a pin 156 to the extension 144. The member 154 has an elongated opening 158 extending longitudinally thereof adjacent the opposite end of the pin 156.

In operation, the arm 132 is manually moved into engagement with the detent 140. This movement causes pivoting of the arm 130 via the member 154. Pivoting of arm 130 causes rotation of the guide shaft 102. Rotation of the guide shaft causes rotation of the rod 128 which is connected thereto. The rod 128, which is slidingly connected to forked arm 124 carries with it the plate 86 to thus pivot the knife blade 72 towards the ham 28 mounted in the slicer. These movements are shown in dotted lines in FIGS. 2 and 3.

Upon initial movement of the arm 132, the spring 146 will tend to stretch out rather than to move the relatively heavy structure associated with the knife blade 72. While the spring 146 will eventually cause movement of the structure the heavy stress on spring 146 would cause rapid deterioration of the spring. The member 154 is thus provided to effectuate the initial movement of the structure associated with the knife blade. When the arm 132 is moved toward the detent 140, the spring 146 will stretch out until the outer end of opening 158 engages the pin 155 on arm 130. A rigid connection will then be formed between the extension 144 and the arm 130, causing movement of the arm 130. Assuming an average diameter bone, the arm 130 will eventually come to rest with the pin 155 intermediate the ends of opening 158. This position permits the knife blade to move either inwardly or outwardly to the extent of the length of opening 158.

The spring connection of arm 130 with extension 144 permits the arm 130 to move when the force is applied thereto. Consequently, when the knife blade 72 contacts the thick portion of the bone in the meat, it can move outwardly away from the bone When the bone thins down, the knife will move back towards the center of the cut of meat under the tension of spring 146. Thus, the knife will always cut right up to the bone and is able to cut meat having non-uniform diameter bones such as hams.

Figure 4:
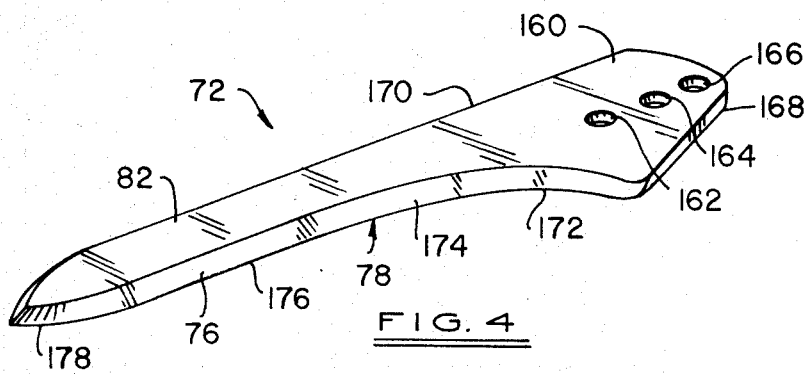
FIG. 4 is a view in perspective of the knife blade utilized in the reciprocating knife structure of the meat slicer.

Attention is now directed to the configuration of the knife blade 72, which may best be seen in FIGS. 2 and 4. The knife blade 72 has a relatively wide base portion 160 having three openings 162, 164, 166 therein for securement to the knife carriage. The relatively wide base portion is desirable in that it provides adequate structure at the point of attachement to the carriage to withstand the forces applied during use without failure of the blade. The first edge portion 168 extends from the inner end of the knife blade at an angle outwardly from the rearward edge 170 of the knife blade. This portion is not beveled and a cutting edge is not defined thereon. First cutting edge portion 172 extends from portion 168 and is curved rearwardly towards the rear edge portion 170. The curved portion 172 terminates at about point 174, which is approximately midway of the entire cutting edge portion. From this point on, second cutting edge portion 176 extends substantially straight and parallel to the rearward edge portion 170 with the outer end portion of the knife terminating in rearwardly curved portion 178.

It has been found in practice that the knife blade 72 results in superior performance over a knife blade which has a substantially straight cutting edge. The knife blade 72 results in reducing the vibration level of the meat slicer dring operation thereof. Previously, knife blades with straight edges have caused substantially severe vibration. This has resulted in premature breakdown and wearing of componenets of the slicing machine, particularly the various bearings and bushings associated with the knife carriage structure. It is additionally believed that other components of the machine may have been prematurely wearing out as a consequence of the vibration caused by the knife blade. It is believed that the difference in vibration level may be caused by the overall configuration of the knife blade, particularly the configuration of the cutting edge. Curved portion 168, which does not come into contact with the central bone in the meat, results in a longer cutting edge than would be the case of an entirely straight cutting edge on a knife. This additional length of cutting edge may result in superior cutting. Also, the curved configuration may be complementary to the shape of the meat and the path of rotation to thereby result in superior performance. The straight cutting edge portion 176 is the portion in contact with the bone of the meat. Ham bones are not cylindrical in shape and have peripheral irregularities. As shown in FIG. 2, when such an irregularity 180 impinges upon straight portion 176, it will not drive the blade out as far from the center of the meat as would be the case if such portion were curved or angled (such as in a triangularly shaped knife blade) because the irregularity contacts the blade at a later point. This therefore reduces the in and out motion of the knife blade and thereby results in less vibration.

Having thus described our invention, we claim:

1. A spiral meat slicer for forming a continuous spiral slice on a cut of meat having an irregularly shaped bone extending therein comprising means for mounting the meat with the bone as a substantially vertical axis about which to rotate the meat, a vertically movable carriage, a knife for slicing the meat mounted on said carriage, said knife being positioned with respect to the axis of rotation of the bone to enable a spiral cut to be made in the meat, said knife being an elongated member having a relatively wide base for mounting on said carriage said knife including an inner end and an outer end and a rearward edge and a forward edge, said forward edge including a cutting edge for slicing the meat, said cutting edge comprising a first portion extending from the base and curving toward said rearward edge and a second straight portion extending therefrom to near the outer end of the knife blade, means for longitudinally reciprocating the knife against the meat, means for automatically tensioning said knife against the meat, means for rotating the meat, and means for relatively moving said carriage vertically with respect to the meat to advance the knife along the axis of rotation of the meat to form a continuous spiral slice in the meat, further characterized in that said curved portion of the cutting edge extends to about the midpoint of the cutting edge and is curved to be complementary to the shape of the meat and to the path of rotation whereby the operational vibration level is reduced.

2. A spiral meat slicer as defined in claim 1, further characterized in that said knife is about one eighth inch thick, and a bevel provided on the underside of the knife at the forward edge to define the cutting edge of the knife.

* * * * *